United States Patent Office 3,578,434
Patented May 11, 1971

3,578,434
2,6-DICYANOTRICHLOROPYRIDINE SEED TREATMENT
Robert L. Noeroske, Walnut Creek, and Helen K. Tobol, Concord, Calif., assignors to The Dow Chemical Company, Midland, Mich.
No Drawing. Filed July 23, 1968, Ser. No. 746,730
Int. Cl. A01c 1/06; A01n 21/02
U.S. Cl. 71—77                                    2 Claims

ABSTRACT OF THE DISCLOSURE

Compositions containing 2,6-dicyanotrichloropyridine are applied to seeds to enhance and accelerate growth of the plant and to protect the seeds from pesticidal attack.

BACKGROUND OF THE INVENTION

The present invention relates to plant husbandry and the raising of crops and is particularly concerned with an agronomical practice and composition for protecting seeds and for promoting the emergence, seedling growth and harvest of crop plants.

It is an object of this invention to provide an improved agronomical practice for the raising and protection of seeds and crops. More particular objects are to stimulate and promote the growth of plants, and to protect the seeds from the attack of the organisms of seed rot, root rot and damping-off. An additional object is to provide novel compositions adapted to be employed in the new practice of plant husbandry.

2,6-dicyanotrichloropyridine, the active compound employed in a practice of the present invention, is disclosed in U.S. Pat. No. 3,325,503, together with a method for the preparation thereof.

SUMMARY OF THE INVENTION

The new agronomical practice of this invention comprises treating seeds with 2,6-dicyano-3,4,5-trichloropyridine. This seed treating practice protects the seeds and emerging seedlings from the soil-dwelling organisms of damping-off, seed rot and root rot, while simultaneously promoting the growth of the plant. This promotion of growth is quite apart from any related factor of disease control, the treated seeds having decreased emergence time and the plants having a more rapid growth and earlier maturation that would otherwise be obtained in the absence of treatment. For convenience, the active compound 2,6-dicyano-3,4,5-trichloropyridine employed in the present invention is referred to in the specification and claims as "2,6-dicyanotrichloropyridine."

The application to seeds of an effective growth stimulating dosage of 2,6-dicyanotrichloropyridine is essential and critical for the practice of the present invention. The application of this dosage inherently provides a microbiocidal dosage of this compound to the seed, as well. At the same time, care must be observed not to apply so large a dosage as to give rise to lasting symptoms of phytotoxicity in the plant. Good results are obtained when the seeds are treated with 2,6-dicyanotrichloropyridine at a dosage of from about ⅛ oz. per hundred pounds of seed up to the phytotoxic threshold. The latter is about 4 ounces per hundred pounds of seed inasmuch as lasting phytotoxic effects are obtained with most plants at dosage levels above the 4 ounce level. Depending on the particular plant species and variety and on the growing conditions (extremely hot growing conditions accelerating phytotoxicity in cotton, for example), some undesirable phytotoxic effects may be encountered even below the 4 ounce level. Accordingly, a preferred range is from about ⅛ to about 2 ounces of 2,6-dicyanotrichloropyridine per hundred pounds of seed. Within this range the maximum growth response is obtained, and any phytotoxicity experienced in the very early stages of plant growth is usually overcome as the plant begins the more rapid growth and maturation habit which characterizes the present process. It may be noted that soybeans are particularly sensitive in this regard, and best results are obtained in their treatment at maximum dosage levels of about 1 ounce per hundred pounds of seed. Usage of 2,6-dicyanotrichloropyridine in amounts above these preferred levels, and up to about 4 ounces per hundred pounds of seed, may have benefits from a disease control standpoint in some instances and can be resorted to when phytotoxicity factors so permits.

2,6-dicyanotrichloropyridine is an off-white crystalline solid having a melting point of about 200° C. It is very lightly soluble in water and is readily soluble in most organic solvents. In accordance with the present invention, this compound is well adapted to the applied to the seeds of such plants as corn, cotton, soybeans, peas, wheat, rice, sugar beets and peanuts, among others, to enhance the growth of the plant and to protect the seeds from the attack of the oranisms of damping-off and seed and root rot.

The method of the present invention may be carried out by treating the seeds with the unmodified 2,6-dicyanotrichloropyridine compound. However, said method also embraces the employment of liquid or dust compositions containing this compound. In such usage, the compound may be modified with one or more of a plurality of additaments, microbiocide or fungicide adjuvants, including solvents or other liquid carriers, surface-active dispersing agents and carriers such as finely divided inert solids. Depending on the concentration of toxicant, such augmented compositions are adapted to be applied to seeds, or employed as concentrates and subsequently diluted with additional adjuvant or carrier to produce the ultimate seed treating compositions. The required amount of the 2,6-dicyanotrichloropyridine conveniently may be applied in from about 1 to 50 ounces of liquid or solid carrier, per hundred pounds of seeds.

The exact concentration of the 2,6-dicyanotrichloropyridine toxicant compound to be employed in the treating composition may vary provided the required fungicidal and growth promoting dosage of the active compound is applied to the seeds. The concentration in liquid and dust compositions employed to supply the desired dosage generally is from about 0.1 to 50 percent by weight. In dusts, the concentration of the effective agent may be from about 1 to 20 percent by weight. In compositions to be employed as concentrates, the active agent may be present in a concentration of from about 5 to 98 percent by weight.

Liquid compositions containing the desired amount of the 2,6-dicyanotrichloropyridine active agent may be prepared by dissolving or incorporating the agent in an inert organic liquid such as acetone or carbon tetrachloride, or by dispersing the agent in water preferably with the aid of a surface-active agent. The preferred liquid carriers are those which are adapted to accomplish the distribution of the agent upon the surfaces of seeds and are of such volatility that they evaporate from the treated seed and do not adversely affect germination.

The aqueous compositions to be employed in the present method may contain one or more water immiscible solvents for the 2,6-dicyanotrichloropyridine. In such compositions, the carrier may comprise an aqueous emulsion, i.e., a mixture of water immiscible solvent, surface-active dispersing agent and water. Surface-active agents which may be employed in the compositions of the present invention include ionic and non-ionic materials such as condensation products of alkylene oxides with phenols and organic acids, alkyl aryl sulfonates, polyoxyethylene derivatives of sorbitan esters, complex ether alcohols, mahogany soaps and the like.

In the preparation of dust compositions, the active agent is dispersed in and on a finely divided solid such as talc, chalk, gypsum and the like. In such operations, the finely divided carrier is mixed with the toxicant or wet with a solution thereof in a volatile organic solvent. Similarly, dust compositions containing the active agent may be prepared from various of the solid, surface-active dispersing agents such as bentonite, fuller's earth, attapulgite and other clays. Depending upon the proportion of ingredients, these dust compositions may be employed as concentrates or subsequently diluted with additional solid, surface-active dispersing agent or with talc, chalk gypsum or the like to obtain the desired amount of the active agent in a composition adapted to be employed for the treatment of seeds. The dust compositions may also include one or more of the ionic or non-ionic surface-active agents such as alkyl aryl sulfonates, polyoxyethylene derivatives of sorbitan esters, or the like, as discussed in the preceding paragraph, to improve the wettability of the dust or powder. These various dust and powder compositions may be dispersed in water to form aqueous seed treating compositions.

The treatment of the seeds may be accomplished by shaking or otherwise contacting the seeds with a dust composition containing the active agent, or by wetting the seeds with a liquid composition prior to planting. In a convenient method of application, the compositions are applied in the form of dusts or sprays to the seeds as the latter are transported on the surface of a slowly moving belt or a perforated material such as a wire screen. In still another method, the required dosage of active agent can be applied on and about the seeds by the seed planting implement either in the hopper box or as the seeds are being deposited in the hill or are otherwise sown. The seeds being treated may be otherwise untreated or they may bear a coating of another previously applied active agent such as a pesticide of the mercurial type. Similarly, seeds coated with 2,6-dicyanotrichloropyridine in accordance with the present practice may subsequently be provided with one or more additional coatings of other protective or growth promoting agents, if desired.

DESCRIPTION OF THE PREFERRED EMBODIMENTS

The following examples merely illustrate the invention and are not to be construed as limiting:

Example 1

2,6-dicyanotrichloropyridine is dispersed in acetone to prepare compositions variously containing 141.88, 70.94, 35.47 and 17.73 grams of chemical per liter of ultimate mixture. These compositions are applied to non-acid delinted cotton seed (previously coated with a mercurial bacteriocide (Ceresan) at a dosage of 3 fluid ounces per hundred pounds of seed) to protect the seed from the complex of rot and damping-off organisms. In such operations, the cotton seed is uniformly wet with the composition which is applied at a rate of 800 cc. per hundred pounds of seed. In the case of the composition containing 141.88 g. of chemical per liter, this treatment supplies 4 ounces of the active chemical per hundred pounds of seed, while the other compositions of progressively lower concentration supply 2 ounces, 1 ounce and ½ ounce, respectively, of the chemical per hundred pounds of seed. Following the treatment, the seeds are planted in seed beds of sandy loam soil naturally infested with soil organisms including Rhizoctonia solani and allowed to germinate at 65° F. in a high humidity chamber. After one week the seed beds are transferred to a greenhouse environment and maintained under good growing conditions. In a check operation, the seed beds of the same infested soil are planted with cotton seed treated only with Ceresan and with cotton seed bearing no treatment at all. In another check operation, the soil is planted with Ceresan coated cotton seeds which have been overcoated with 10 ounces of Demosan (dichlorodimethoxybenzene) per hundred pounds of seed, this being a commercial standard treatment.

Two weeks after emergence of the seeds from the soil, a count is made of the number of surviving plants in each bed, this data being particularly significant as an indicia of post-emergence, damping-off control. From the results obtained as expressed below in Table I, it is seen that treatment with 2,6-dicyanotrichloropyridine gives results which are fully as good as the commercial standard treatment from a disease control standpoint and which are superior thereto as regards early emergence.

TABLE I

Post-emergence damping-off control on cotton seeds

| Treatment (oz. 2,6-dicyanotrichloropyridine/100 lbs. seed): | Percent cotton plants Surviving (Avg. of several tests) |
|---|---|
| (1) 4(+Ceresan) | 65 |
| (2) 2(+Ceresan) | [1] 70 |
| (3) 1(+Ceresan) | [1] 69 |
| (4) 0.5(+Ceresan) | 58 |
| (5) Ceresan+Demosan | 70 |
| (6) Ceresan only | 45 |
| (7) Untreated seed | 6 |

[1] These treatments are the first to emerge.

Example 2

In order to determine the effect of 2,6-dicyanotrichloropyridine on root development of seeds, acid delinted cotton seeds bearing a mercurial undercoat (Panogen) are treated with compositions of said pyridine compound in acetone precisely in the fashion set forth in Example 1 to obtain seeds carrying the 2,6-dicyanotrichloropyridine dosage in amounts of 4, 2, 1, ½ and ¼ ounce per hundred pounds of seed. The test is conducted by placing 10 seeds of each dosage level in the bottom of an ointment jar atop a filter paper disk well moistened with distilled water. Similar "plantings" were made with cotton seed bearing only the Panogen treatment. Each jar is then tightly sealed and incubated in the dark for 6 days at 65° F. The jars are then opened and the average hypocotyl length of the germinating seedlings present in each jar is determined. The results obtained are expressed in Table II below.

TABLE II.—EFFECT OF ACTIVE COMPOUND ON COTTON ROOT DEVELOPMENT

| Dosage rate of 2,6-dicyanotrichloropyridine (oz. per 100 lb. seed) | None | 4 | 2 | 1 | 0.5 | 0.25 |
|---|---|---|---|---|---|---|
| Average hypocotyl length (mm.) | 5 | 7 | 21 | ([1]) | 31 | 10 |

[1] Imperfect container seal, seeds dry.

Example 3

Solutions of 2,6-dicyanotrichloropyridine in acetone are prepared and applied to various lots of corn and Panogen treated, acid delinted cotton seeds at rates of 4, 2, 1, 0.5 and 0.25 ounces per hundred pounds of seed exactly as described in Example 1. The seeds are then planted in warm, moist, sterile soil and maintained in a greenhouse under good growing conditions at temperatures of 70°–85° F. for the duration of the test. Check samples of the same seeds are planted in a like manner. The check corn seeds are untreated, while the check cotton seeds bear a Panogen treatment.

At the end of 5 weeks the average height of the plants in each treated lot is measured and compared with that of the untreated check plants. At the same time, a representative number of plants in each treated lot are severed at the soil line and the above ground portion weighed in the fresh condition. This weight is compared with that of similarly cut check plants. The results obtained are expressed below in Table III.

TABLE III.—EFFECT OF ACTIVE CHEMICAL ON GROWTH OF CORN AND COTTON SEEDS

| Dosage rate of 2,6-dicyanotrichloropyridine (oz. per 100 lb. seed) | 4 | 2 | 1 | 0.5 | 0.25 |
|---|---|---|---|---|---|
| | Increase in growth after 5 weeks (as percent of check plants) | | | | |
| Corn height increase | 1.62 | 6.5 | 8.9 | 13.8 | 8.1 |
| Corn weight increase | 0.0 | 23.5 | 21.3 | 51.8 | 22.8 |
| Cotton height increase | 13.0 | 23.9 | 21.7 | 27.17 | 15.2 |
| Cotton weight increase | 1.8 | 23.0 | 29.0 | 44.0 | 11.5 |

The remaining plants are allowed to grow, and it is noted that tasseling and setting of ears in the corn plants occur as much as 2 weeks earlier in the treated than in the check plants. In the case of the cotton plants, a similar earlier blossoming and setting of the bowls is observed.

Example 4

In the manner described in Example 1, pea seeds of the Little Marvel variety are treated with acetone solutions of 2,6-dicyanotrichloropyridine to provide the seeds with dosages of 2 and 0.5 ounces of the active chemical per hundred pounds of seeds. The treated seeds are sown in the field and allowed to grow. Check plots are also seeded to untreated peas of the same variety. Shortly after emerging from the ground, a count is made on the several plots to determine the percentage of planted peas which emerge. In the case of the checks, the emergence rate is 38 percent, while with the peas treated with active chemical at the 0.5 and 2 ounce levels, the rate is 76 and 78 percent, respectively. It is noted that the treated pea seedlings emerge at an earlier date than the checks. Further, as the plants grow to maturity, it is observed that those from the treated seeds uniformly present a more vigorous appearance.

Example 5

(a) Ten parts by weight of 2,6-dicyanotrichloropyridine are dissolved in 100 parts of a petroleum hydrocarbon fraction boiling at from about 312° to about 350° F. and having a flash point of about 116° F. (Stoddard Solvent) to produce a composition in the form of a solvent solution and having a flash point greater than 100° F.

(b) Fifty parts by weight of 2,6-dicyanotrichloropyridine, 2 parts of a polymerized sodium salt of a substituted benzoid alkyl sulfonic acid (Daxad No. 27) 1 part of an alkyl aryl sulfonate (Dowfax 9N9), 5 parts of polypropylene glycol (P-2000) and 42 parts of Barden clay are mechanically mixed and ground together to prepare a composition in the form of a wettable powder.

(c) A duct composition is prepared by mixing and grinding together 6 parts by weight of 2,6-dicyanotrichloropyridine and 94 parts of bentonite.

These compositions are adapted to treat the seeds of such plants as corn, cotton, peas, beans, wheat, rice, sugar beets and peanuts to enhance the growth of the plant and to protect the seeds from the attack of the organisms of damping-off and seed and root rot.

Example 6

Soybeans are coated with an aqueous slurry of the wettable powder of Example 5(b) to give final concentrations on the seeds of 1, ½ and ¼ ounces of the active chemical per hundred pounds of seed. The treated seeds are then planted in sterile soil and grown under greenhouse conditions at temperatures of about 70°–85° F. Untreated soybeans are also planted in the same fashion as checks. At the end of 5 weeks, the height of the several plants is measured and it is found that the seeeds treated at the ½ and ¼ ounce rates are 20 percent taller than the untreated checks. Those plants treated at the 1 ounce rate are 15 percent taller than the check plants. The overall appearance of all plants in the treated lots is very good.

Example 7

The operation of Example 6 is repeated with sugar beet seeds of the 101–H monogerm variety having an undercoat of a commercial insecticide and fungicide so as to provide the seeds with an overcoat of 2,6-dicyanotrichloropyridine in amounts of 2, 1 and ½ ounces per pounds of seed. These seeds are sown in the field and allowed to grow. At the same time, check seeds bearing only the commercial coating are also planted. At the end of 8 weeks of growth, it is observed that all the treated plants present a decidedly more vigorous appearance than the untreated checks. In the case of the plants treated at the 2 ounce dosage, it is noted that the leaves are approximately 20 percent larger than the leaves on the check plants.

2,6-dicyanotrichloropyridine can be prepared by reacting 2,6-dicyanopyridine with chlorine at temperatures of at least 350° C. in the presence of an activated carbon catalyst impregnated with barium chloride, as disclosed in U.S. Pat. No. 3,325,503. Alternatively, the compound can be prepared by reacting 2,6-dicyanopyridine with an excess of chlorine in the vapor phase in the presence of a diluent gas such as methylene chloride or chloroform at temperatures of about 600° C. The 2,6-dicyanopyridine starting material, can be prepared by reacting 2,6-lutidine with ammonia and oxygen at elevated temperatures in the presence of a catalyst in accordance with the "ammoxidation" method described in Chemical Engineering Progress, September 1964, pages 48–9.

We claim:

1. The method for enhancing plant growth which comprises coating plant seeds with 2,6-dicyanotrichloropyridine at a dosage rate of from ⅛ ounce to 4 ounces per hundred pounds of seed.

2. The method of claim 1 wherein the 2,6-dicyanotrichloropyridine is applied to the seeds in admixture with an inert adjuvant as a carrier.

References Cited

UNITED STATES PATENTS 3,325,503    6/1967    Bimber _____ 260—294.9

LEWIS GOTTS, Primary Examiner

C. L. MILLS, Assistant Examiner

U.S. Cl. X.R.

47—57.6; 71—94; 424—263